United States Patent
Subramanian et al.

(10) Patent No.: US 11,956,214 B2
(45) Date of Patent: Apr. 9, 2024

(54) MEDIA ACCESS CONTROL ADDRESS LEARNING LIMIT ON A VIRTUAL EXTENSIBLE LOCAL AREA MULTI-HOMED NETWORK ETHERNET VIRTUAL PRIVATE NETWORK ACCESS PORT

(71) Applicant: DELL PRODUCTS L.P., Round Rock, TX (US)

(72) Inventors: Saye Balasubramaniam Subramanian, Chennai (IN); Damodharan Sreenivasagaperumal, Chennai (IN); Kishore Yetikuri, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 418 days.

(21) Appl. No.: 16/921,615

(22) Filed: Jul. 6, 2020

(65) Prior Publication Data
US 2022/0006785 A1    Jan. 6, 2022

(51) Int. Cl.
*H04L 9/40* (2022.01)
*H04L 12/46* (2006.01)

(52) U.S. Cl.
CPC ...... *H04L 63/0272* (2013.01); *H04L 12/4641* (2013.01); *H04L 63/0236* (2013.01)

(58) Field of Classification Search
CPC ............ H04L 63/0272; H04L 12/4641; H04L 63/0236; H04L 12/4633
See application file for complete search history.

(56) References Cited

U.S. PATENT DOCUMENTS

| | | | |
|---|---|---|---|
| 10,715,411 B1 * | 7/2020 | Jacob Da Silva | H04L 67/566 |
| 2005/0055570 A1 * | 3/2005 | Kwan | H04L 63/102 726/4 |
| 2007/0195793 A1 * | 8/2007 | Grosser | H04L 45/60 370/395.53 |
| 2013/0016606 A1 * | 1/2013 | Cirkovic | H04L 43/10 370/225 |
| 2017/0288970 A1 * | 10/2017 | Lin | H04L 45/66 |
| 2019/0132241 A1 * | 5/2019 | Vattem | H04L 45/16 |
| 2019/0239276 A1 * | 8/2019 | Virtanen | H04W 24/04 |
| 2019/0312887 A1 * | 10/2019 | Grimm | H04L 63/145 |
| 2020/0127919 A1 * | 4/2020 | Nagarajan | H04L 45/28 |

* cited by examiner

*Primary Examiner* — Maung T Lwin
*Assistant Examiner* — Suman Debnath
(74) *Attorney, Agent, or Firm* — NORTH WEBER & BAUGH LLP

(57) ABSTRACT

Systems and methods for enforcing media access control (MAC) learning limits (MLLs) on multi-homed access ports comprise configuring MLL violation actions to be performed by a virtual extensible local area network (VxLAN) tunnel endpoint (VTEP). The VTEP is multi-homed to VTEPs and comprises an Ethernet segment (ES) access port. A BGP EVPN or similar protocol may be used to communicate MLL information across VTEPs participating in the multi-homed ES to keep MACs and MLL violation actions consistent. The violation actions may comprise initiating a shutdown message to shut down an ES. Once an MLL violation associated with a MAC that has been received at the VTEP is detected, the VTEP may enforce the MLL by performing one or more of the configured MLL violation actions and propagate the same to other VTEPs.

20 Claims, 6 Drawing Sheets

MEDIA ACCESS CONTROL ADDRESS LEARNING LIMIT ON A VIRTUAL EXTENSIBLE LOCAL AREA MULTI-HOMED NETWORK ETHERNET VIRTUAL PRIVATE NETWORK ACCESS PORT

BACKGROUND

The present disclosure relates generally to computer networking. More particularly, the present disclosure relates to systems and methods for enforcing media access control (MAC) address learning limits on EVPN multi-homed virtual extensible local area network (VxLAN) Ethernet access ports.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

MAC Learning Limit is a port security feature employed on different types of access ports, including VxLAN access ports. However, there are no known methods that would implement MAC learning limits on EVPN multi-homed access ports. Since an EVPN multi-homed access port utilizes an Ethernet segment (ES) that spans more than one VxLAN tunnel endpoint (VTEP), it is not possible to independently enforce a MAC Leaning Limit (MLL) on each VTEP or node as this would lead to different sets of MACs being present in different VTEPs within the same ES. Accordingly, it is highly desirable to find new ways to enforce MAC address learning limits on multi-homed access ports, such as VxLAN EVPN multi-homed access ports.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
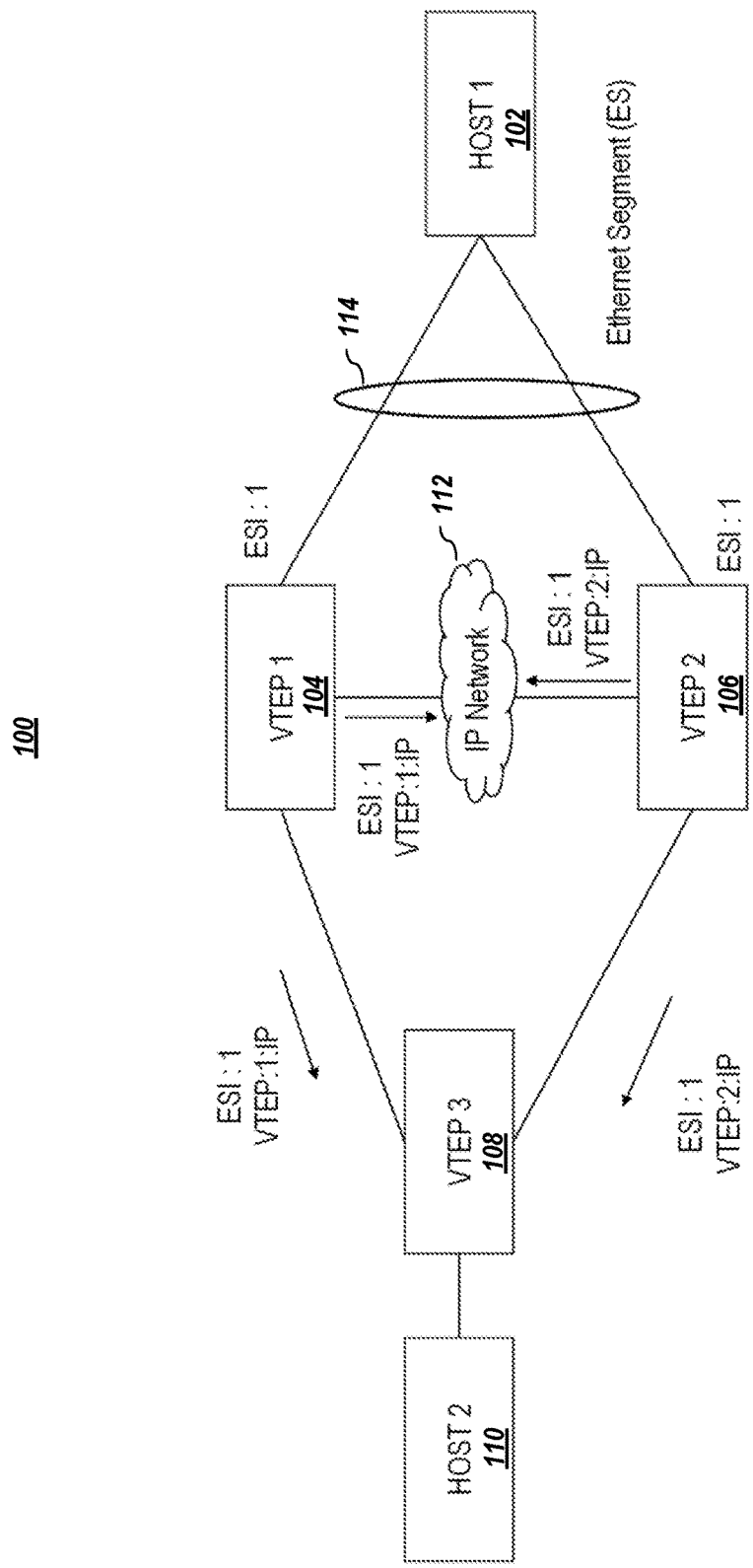
FIG. 1 depicts a multi-homed information handling system according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall also be noted that although embodiments herein are described for MLL use cases on multi-homed ES access ports in VxLANs that use MP-BGP EVPN protocols, aspects of the present disclosure are not so limited. Accordingly, the aspects of the present disclosure may be applied or adapted for use in other networks and contexts, employing other protocols known in the art.

In this document, term MAC refers to a media access control addresses, the term VTEP refers to virtual extensible local area network (VxLAN) tunnel endpoints and VTEP devices, and "sync" refers to any type of synchronization events known in the art. An MLL is a selectable value that defines the limit of MACs that can be learned on a given Ethernet/LAG port. An event in which a specified number of MACs is reached or exceeded represents an MLL violation. A suitable response to an MLL violation incudes various actions that may be specified and configured, e.g., on an ingress port, including dropping received packets that have a new source MAC, shutting down a port, etc. Oftentimes, the BGP EVPN protocol is used as a tool to communicate information between the VTEPs and to sync learned MACs and ARPs with peer VTEPs in a network. As previously mentioned, there exist no known methods that implement MLLs on multi-homed access ports.

FIG. 1 depicts a multi-homed information handling system according to embodiments of the present disclosure. Network 100 comprises IP network 112, Ethernet Segment 114, and various network nodes comprising hosts 102, 110 and VTEPs 104-108. Hosts 102, 110 may be implemented, e.g., customer edge (CE) devices that are located on customer sites and that may be members of a virtual LAN (VLAN), e.g., VLAN1 (not shown). As depicted in FIG. 1, host 102 is multi-homed to ES access ports in VTEP 104 and VTEP 106. In contrast, host 110 may be directly coupled to an access ports in VTEP 108. In embodiments, VTEPs 104-108 may be VxLAN termination points, i.e., provider edge (PE) VTEPs that may be coupled to each other directly or via network 112.

In operation, VTEPs 104-108 may use a MP-BGP EVPN protocol to facilitate VxLANs by mapping VLAN IDs into virtual network IDs and vice versa, such as to extend VLAN1 across network 100 from host 102 to host 110, which hosts may use the VLAN IDs to communicate with VTEPs 104-108.

In embodiments, the MP-BGP EVPN protocol may facilitate communication between VTEPs 104-106 associated with an Ethernet Segment Identifier (ESI), such as ESI 1, to sync MACs by taking advantage of the MP-BGP EVPN control plane that may provide protocol-based VTEP peer discovery and end-host reachability information distribution, which enables scalable VxLAN overlay network designs that may be suitable for both private and public clouds. As depicted in FIG. 1, each of VTEP 104 and VTEP 106 may be coupled to host 102, e.g., by using ES connectivity identified by ESI 1.

In embodiments, by connecting a CE device, such as host 102, on a customer site to two or more VxLAN termination points, such as VTEPs 104, 106, EVPN multi-homing enables redundant connectivity. In embodiments, link-level redundancy may be achieved by multi-homing CE device 102 to different VTEP devices 104, 106 or to the same VTEP device (e.g., 104) that may utilize a plurality of links (not shown). Multi-homing may be "single-active," i.e., only one of VTEPs 104, 106 forwards traffic from host 102, or "all-active," i.e., all VTEPs coupled to host 102 forward traffic from host 102.

In embodiments, the MP-BGP EVPN protocol may be used to form EVPN multi-homed access ports that may be identified by their ESI. In embodiments, VTEP peer discovery using EVPN protocol VTEP makes the ES known to all VTEPs 104-108 in the VxLAN network. For example, as illustrated in FIG. 1, multi-homed VTEP 104 may advertise ES 1 to both VTEP 106 and VTEP 108. Similarly, multi-homed VTEP 106 may advertise ES 1 to both VTEP 104 and VTEP 108.

In embodiments, once host 102 sends a packet that comprises a MAC to the ES access port of VTEP 104, VTEP 104 may learn the MAC, e.g. on VN1, and advertise this information to VTEP 108. VTEP 108 may add, i.e., learn this information to its MAC address table pointing to VTEP 104. Once host 110 sends to VTEP 108 a packet having as a destination address the MAC address of host 102, VTEP 108 will know whether to send the packet to VTEP 104 or VTEP 106 that span the same ES.

Similarly, packets sent by host 102 may be sent to either VTEP 104 or VTEP 106, for example, based on a hashing algorithm. As a result, some MACs may be learned on VTEP 104 and others may be learned on VTEP 106. In embodiments, the MACs may be synced using the MP-BGP EVPN protocol. Assuming host 102 has sent five MACs associated with ES-1 to VTEP 104 such that VTEP 104 has learned five MACs, and further assuming that host 102 has sent five MACs associated with ES-1 to VTEP 106 that have been learned on VTEP 106, then, the MP-BGP EVPN protocol may operate to exchange between VTEP 104 and VTEP 106 all ten learned MACs that point to ES-1. Further assuming that VTEP 104 and VTEP 106 both have been configured to each have an MLL of ten, the question arises how the MLL can be enforced on ES-1 in a manner such that when multi-homed host 102 sends a new source MAC to VTEP 104 or VTEP 106 that would violate the MLL, the same ten MACs may be learned by multi-homed ES access ports on VTEP 104 and VTEP 106 in compliance with the MLL concept and, for example, additional or different MACs beyond the first ten will be dropped.

Therefore, in embodiments, the BGP-EVPN protocol may be modified or extended to a MP-BGP EVPN protocol to facilitate MLL on multi-homed ES access ports by introducing two types of messages: (1) an MLL MAC delete notification, and (2) an MLL ES shutdown notification, discussed in greater detail below. Advantageously, embodiments presented herein do not adversely impact load balancing or any other network features. It is noted that if redundancy is desired, one CE device may be connected to two or more PE devices. In embodiments, an MLL and a corresponding MLL violation action may be configured for a given ES, such as ES-1 in FIG. 1, across all VTEPs that span an ES, here, VTEP 104 and VTEP 106.

In embodiments, one of the VTEPs that participates in the ES may be elected as master VTEP. A suitable election mechanism may be based on any number of criteria, such as, e.g., the lowest VTEP IP address of the participating VTEPs (since each VTEP device knows the unique VTEP IP addresses of all other VTEPs) in a given ES. In embodiments, a master VTEP may be selected in the MP-BGP EVPN control plane, e.g., via a selection process that randomly chooses a VTEP from set of VTEPs to act as the master VTEP or by using any other selection algorithm known in the art.

In embodiments, once a MLL has been locally configured for a given ES, each VTEP may enforce the MLL on the ports that participate in that ES for MACs that have been locally learned or that have been synced with peer VTEPs within the ES. In embodiments, in response to a MLL violation being detected, i.e., that a MAC, if learned, would exceed the MLL that has been configured on the VTEP in the ES, one or more VTEPs may perform a violation action based on their local MLL violation configuration for the ES.

In embodiments, a VTEP may honor a MAC sync request initiated by a master VTEP even if doing so would exceed a locally configured MLL on the VTEP. For example, VTEP 104 in FIG. 1 may receive MAC sync or add request from master VTEP 106 in the same ES-1. If so, irrespective of whether the MLL status has been reached, VTEP 104 may accept the MAC and install it in its hardware table and associate the MAC with the ES network port to identify where to send packets having that MAC as their destination MAC. And, again, remote VTEP 108, not being part of ES-1, may add the MAC to its MAC table and point to both VTEP 104 and VTEP 106, to indicate that Host 102 is reachable via any of VTEP 104 and VTEP 106.

In embodiments, once synced MACs exceed the MLL, master VTEP 106 may send an MLL MAC delete notification to one or more peer VTEPs. In embodiments, in response to receiving the MLL MAC delete message, the owner of the MAC, i.e., VTEP 104 on which the MAC that exceeds the MLL was learned, may issue, in the BGP-EVPN control plane, a withdraw message for that MAC to remove that MAC from, e.g., peer VTEPs in a local ES. However, this is not intended as a limitation since, in embodiments, VTEPs that are not part of the local ES, e.g., remote VTEPs (e.g., 108) that may or may not be associated with any ES, may upon receiving a withdraw message from the owner of the MAC, process the message and remove the MAC from the hardware table.

Advantageously, in this manner, the MACs of master VTEP 106 may be prioritized and enforced throughout the ES in the event that a conflict between VTEP 104 and VTEP 106 exists. In embodiments, master VTEP 106 may resolve conflicts by determining which MACs to keep and remove, thereby, ensuring that the MLL is met. A further advantage of this approach is that, VTEPs that participate in an ES may independently learn, install, and process MACs communicated between VTEPs in the ES, and may independently communicate their responses to various types of events, thereby, enabling network 100 to scale. Several exemplary event handling examples (events and corresponding actions) using the MP-BGP EVPN protocol will be discussed next.

In embodiments, once a new local MAC learn notification received by a given VTEP (e.g., VTEP 104) on a given ES (e.g., ES-1) falls within a given MLL, VTEP 104 may learn the new MAC and attempt to sync the MAC with other VTEPs (e.g., VTEP 106) across the ES. VTEP 106 may then add to its MAC table the synced MAC to ES-1, e.g., by programming the synced MAC into hardware, provided the MAC does not exceed the MLL configured in VTEP 106. Any remote VTEPs that may send and receive traffic from ES-1 but that are not part of ES-1, i.e., VTEPs that are agnostic to MLLs in ES-1 (e.g., VTEP 108), may add the MAC to their MAC table to point to VTEP 104 and VTEP 106 as network ports that the remote VTEP may selectively use an equal cost multi-path (ECMP).

In embodiments, assuming a new local MAC learn notification on ES-1 in VTEP 104 reaches the MLL such that any subsequent MACs would exceed the MLL, once VTEP 104 learns the new MAC, i.e., the last allowable MAC within the MLL, MAC learning for that ES (here ES-1) may be disabled locally, and the MAC may be synced with other VTEPs (e.g., VTEP 106) in ES-1. In embodiments, upon determining that admitting a synced MAC, the MLL would be reached but that the synced MAC does not exceed the local MLL in VTEP 106, the synced MAC may be added to ES-1, and a subsequent MAC learning for that ES may be disabled. Remote VTEP 108, which is not part of ES-1, may add the MAC to its MAC table and associate it with a network port with ECMP path.

In embodiments, assuming that VTEP 104 on local ES-1 receives a packet that comprises a new source MAC that exceeds the MLL, in embodiments, VTEP 104 may initiate a violation action according to its configuration for that local ES. In embodiments, the action may be to shut down the ES. If so, VTEP 104 may cause a shutdown of ES-1, e.g., by propagating an MLL ES shutdown notification to VTEP 106, to enable syncing the shutdown notification with other VTEPs in ES-1. Upon receiving the shutdown notification from VTEP 104, VTEP 106 may power down all ports in ES-1.

Similarly, in embodiments, upon determining that admitting a synced MAC would exceed the MLL for ES-1, VTEP 106 (the master VTEP) may, based on the violation action, ignore or delete that MAC and send an MLL MAC delete notification for that MAC to the originator of the MAC learn notification (e.g., VTEP 104). The MAC delete notification may cause VTEP 104 to send a withdraw message, which may be similar to the withdraw message in the existing BGP EVPN protocol, to withdraw that MAC from all the VTEPs in ES-1 that VTEP 104 has already sent the MAC to, if there are any such VTEPs. Since VTEP 108 does not participate in ES-1, it may ignore the shutdown notification sent by VTEP 104 and, thus, take no action.

Figure 2:
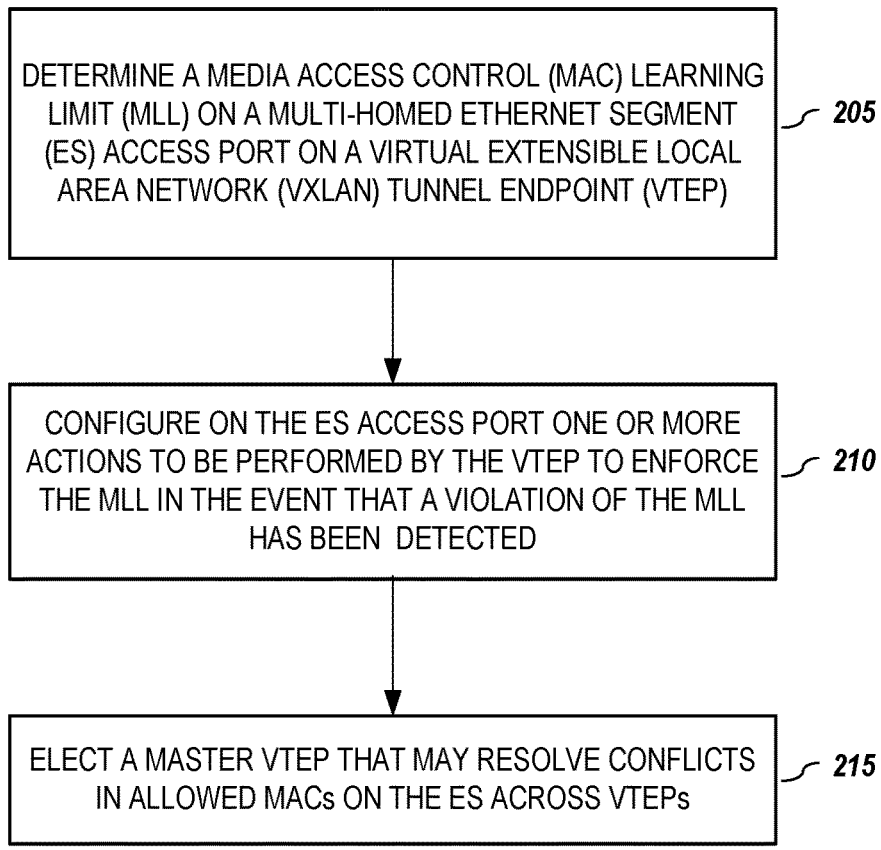
FIG. 2 is a flowchart depicting a method for configuring an MLL on a VxLAN EVPN multi-homed access port of a VTEP, according to embodiments of the present disclosure.

FIG. 2 is a flowchart depicting a method for configuring an MLL on a VxLAN EVPN multi-homed access port of a VTEP, according to embodiments of the present disclosure. In embodiments, process 200 for configuring an MLL may begin by determining (205) an MLL on a multi-homed ES access port of a VTEP.

In embodiments, a number of MLL violation actions may be configured (210) for the VTEP on the ES access port, such that, in response to detecting a MLL violation, the VTEP may enforce the MLL violation action on its ES access port for a learned MAC or a MAC that has been synced from at least one other VTEP in the same ES.

In embodiments, the VTEP may elect (215) itself or another VTEP (participating in the ES as a master for that ES, i.e., a VTEP that also comprises an ES access port and is multi-homed to the same host. In embodiments, the master VTEP may be used to resolve conflicts in allowed MACs on the ES across VTEPs, e.g., by prioritizing and/or overriding sync requests of non-master VTEPs. It shall be noted that herein (1) certain steps may optionally be performed; (2) steps may not be limited to the specific order set forth herein; (3) certain steps may be performed in different orders; and (4) certain steps may be done concurrently.

Figure 3:
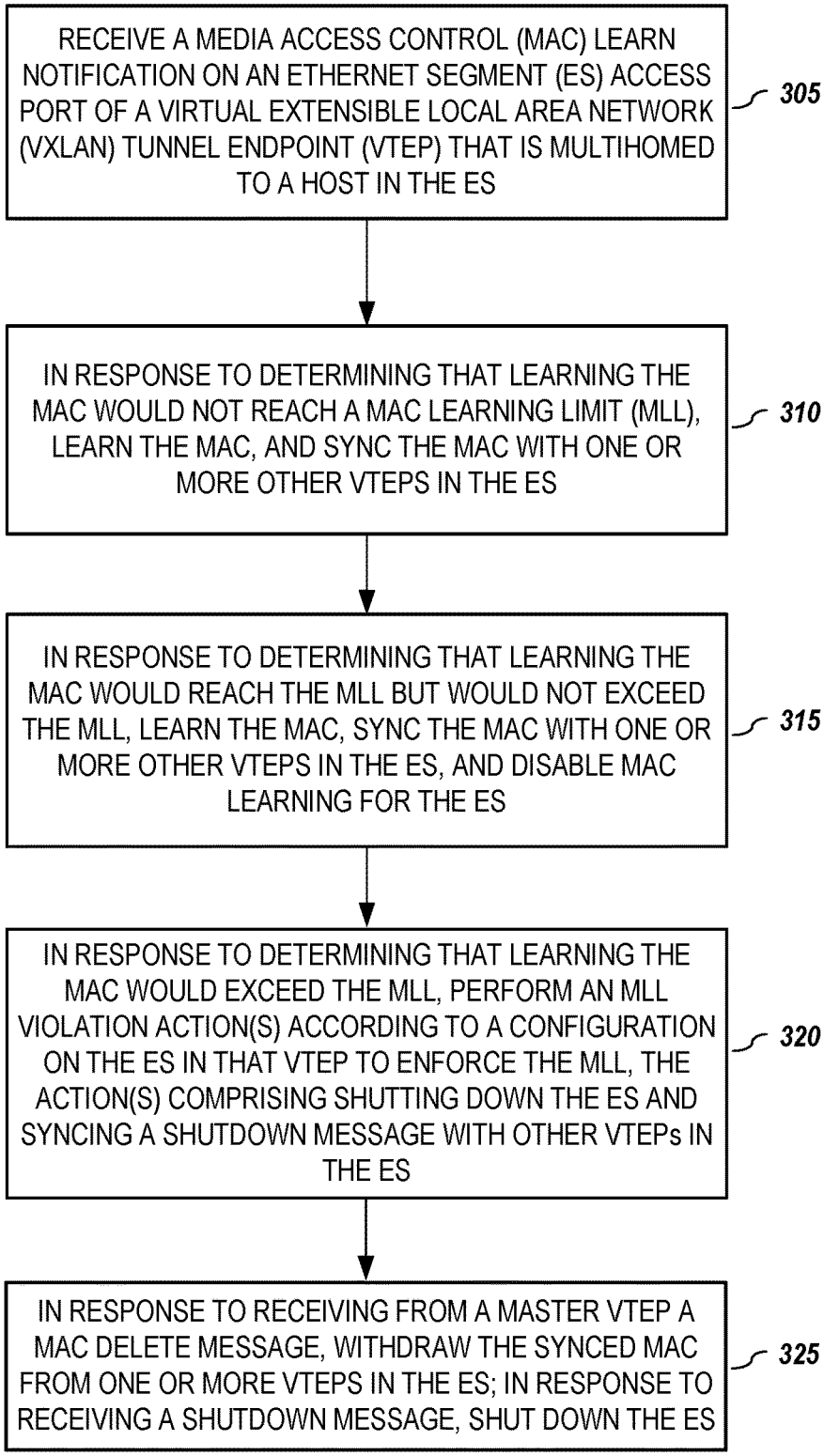
FIG. 3 is a flowchart depicting a method for enforcing an MLL on a VxLAN EVPN multi-homed access port of a VTEP, according to embodiments of the present disclosure.

FIG. 3 is a flowchart depicting a method for enforcing an MLL on a VxLAN EVPN multi-homed access port of a VTEP, according to embodiments of the present disclosure. In embodiments, process 300 for enforcing the MLL may begin by receiving (305), for example at an ES access port of a VTEP that is multi-homed to a host in the ES, a MAC learn notification that is associated with a MAC.

In embodiments, in response to determining that learning the MAC would not reach the MLL and, thus, not trigger an MLL violation at the VTEP, the MAC may be learned and synced (310) with at least one other VTEP in the same ES.

In embodiments, in response to determining that learning the MAC would reach the MLL but would not exceed the MLL and, thus, not trigger an MLL violation at the VTEP, the MAC may be learned and synced with at least one other VTEP in the ES before MAC learning may be disabled (315) for the ES.

In embodiments, in response to determining that learning the MAC would exceed the MLL, an MLL violation action(s) may be performed (320), e.g., according to a configuration on the ES in that VTEP, in order to enforce the MLL. In embodiments, the action(s) may comprise shutting down the ES. If so, the shutdown message may be synced with other VTEPs participating in the ES. Upon receiving the shutdown message from other VTEP, the receiving VTEP may also shutdown the ES.

In embodiments, a synced MAC may be withdrawn (325) from one or more VTEPs, e.g., after receiving from a master VTEP a MAC delete message that may have been generated in response to the master VTEP determining that the MAC would cause the MLL to be exceeded. In addition, in response to receiving a shutdown message from a VTEP, the ES may be shut down. It is noted that, in embodiments, the shutdown message and/or the delete message may be part of a modified MP-BGP EVPN protocol previously mentioned.

Figure 4:
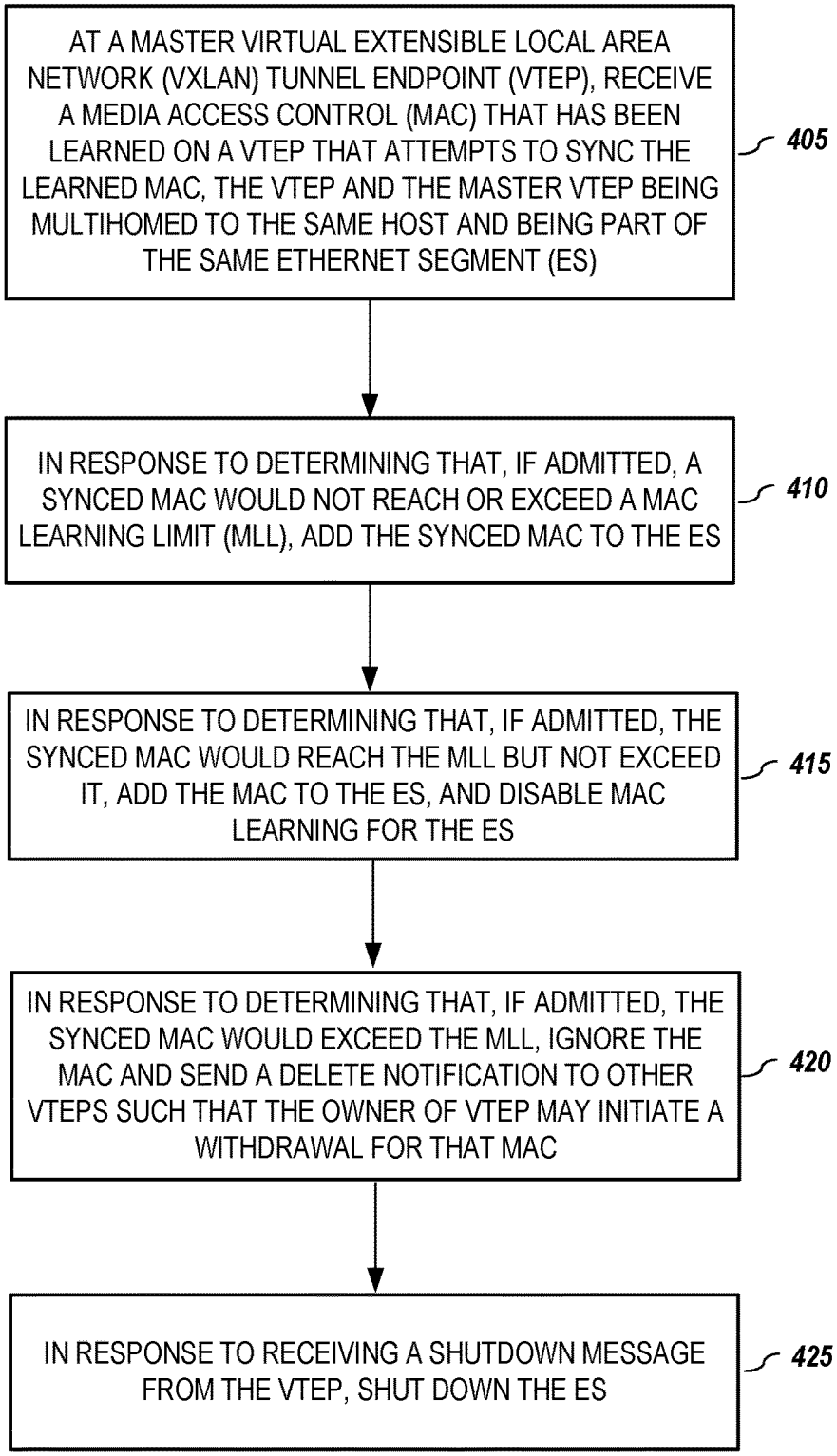
FIG. 4 is a flowchart depicting a method for enforcing an MLL on a VxLAN EVPN multi-homed access port of a master VTEP, according to embodiments of the present disclosure.

FIG. 4 is a flowchart depicting a method for enforcing an MLL on a VxLAN EVPN multi-homed access port of a master VTEP, according to embodiments of the present disclosure. In embodiments, process 400 for enforcing an MLL by a master VTEP may begin by receiving (405), at a master VTEP or a MAC that has been learned on a VTEP that attempts to sync the learned MAC with the master VTEP that is multi-homed with the VTEP to the same host.

In embodiments, in response to determining that, if admitted, the synced MAC would not reach or exceed the MLL, the synched MAC may be added (410) to the ES.

In embodiments, in response to determining that, if admitted, the synced MAC would reach the MLL but would not exceed it, the MAC may be added to the ES, and MAC learning may be disabled (415) for the ES.

In embodiments, response to determining that, if admitted, the synced MAC would exceed the MLL, the master VTEP may ignore the synced MAC and send (420) a delete notification to other VTEPs such that the owner VTEP may initiate a withdrawal for that MAC. In response to receiving a shutdown message from the VTEP, the master VTEP may shut down (425) the ES.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, tablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 5:
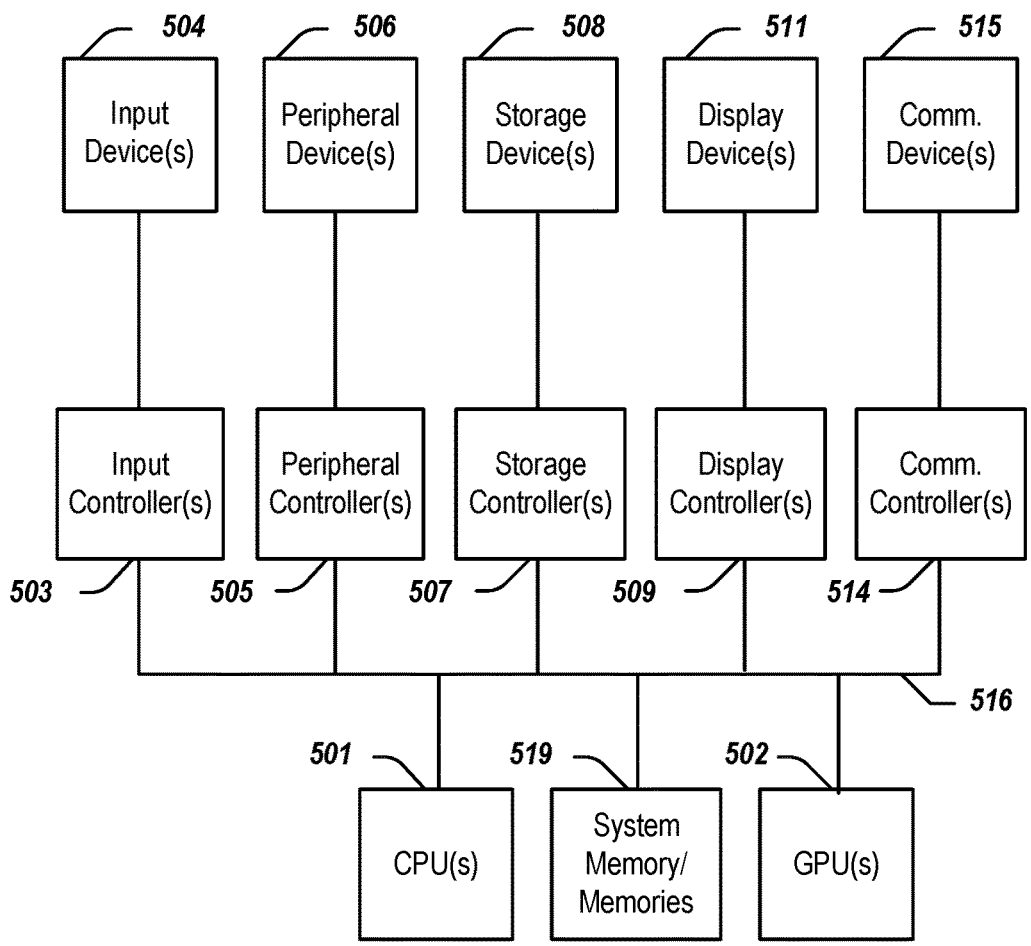
FIG. 5 depicts a simplified block diagram of an information handling system, according to embodiments of the present invention.

FIG. 5 depicts a simplified block diagram of an information handling system (or computing system), according to embodiments of the present disclosure. It will be understood that the functionalities shown for system 500 may operate to support various embodiments of a computing system—although it shall be understood that a computing system may be differently configured and include different components, including having fewer or more components as depicted in FIG. 5.

As illustrated in FIG. 5, the computing system 500 includes one or more central processing units (CPU) 501 that provides computing resources and controls the computer. CPU 501 may be implemented with a microprocessor or the like, and may also include one or more graphics processing units (GPU) 519 and/or a floating-point coprocessor for mathematical computations. In one or more embodiments, one or more GPUs 519 may be incorporated within the display controller 509, such as part of a graphics card or cards. The system 500 may also include a system memory 502, which may comprise RAM, ROM, or both.

A number of controllers and peripheral devices may also be provided, as shown in FIG. 5. An input controller 503 represents an interface to various input device(s) 504, such as a keyboard, mouse, touchscreen, and/or stylus. The computing system 500 may also include a storage controller 507 for interfacing with one or more storage devices 508 each of which includes a storage medium such as magnetic tape or disk, or an optical medium that might be used to record programs of instructions for operating systems, utilities, and applications, which may include embodiments of programs that implement various aspects of the present disclosure. Storage device(s) 508 may also be used to store processed data or data to be processed in accordance with the disclosure. The system 500 may also include a display controller 509 for providing an interface to a display device 511, which may be a cathode ray tube (CRT) display, a thin film transistor (TFT) display, organic light-emitting diode, electroluminescent panel, plasma panel, or any other type of display. The computing system 500 may also include one or more peripheral controllers or interfaces 505 for one or more peripherals 506. Examples of peripherals may include one or more printers, scanners, input devices, output devices, sensors, and the like. A communications controller 514 may interface with one or more communication devices 515, which enables the system 500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 6:
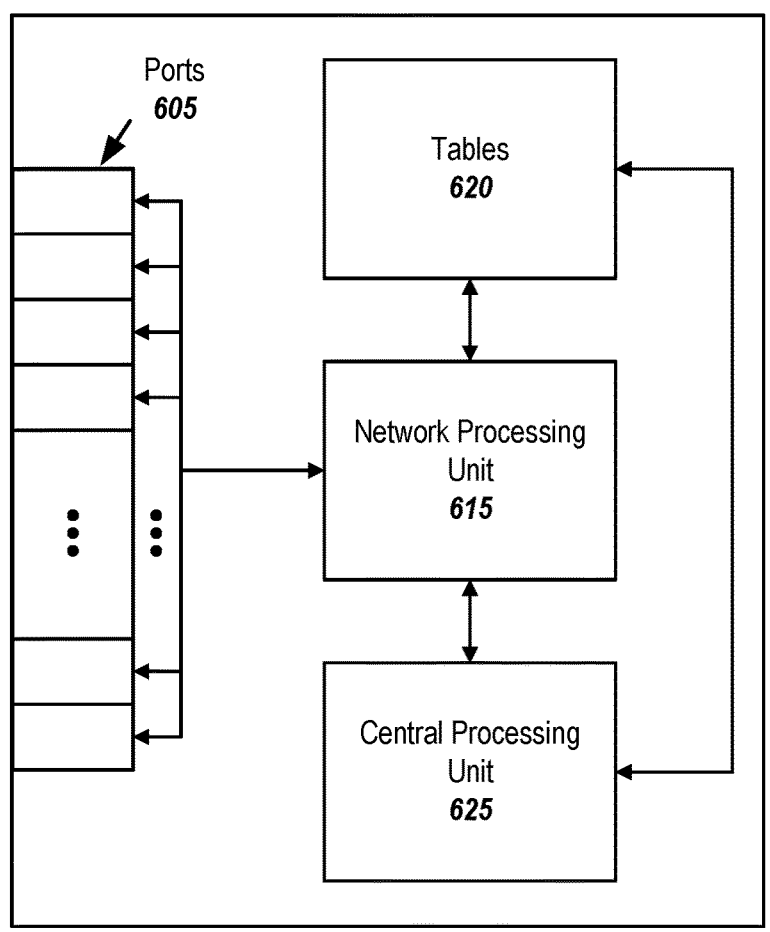
FIG. 6 depicts an alternative block diagram of an information handling system, according to embodiments of the present disclosure.

FIG. 6 depicts an alternative block diagram of an information handling system, according to embodiments of the present disclosure. It will be understood that the functionalities shown for system 600 may operate to support various embodiments of the present disclosure—although it shall be understood that such system may be differently configured and include different components, additional components, or fewer components.

The information handling system 600 may include a plurality of I/O ports 605, a network processing unit (NPU) 615, one or more tables 620, and a central processing unit (CPU) 625. The system includes a power supply (not shown) and may also include other components, which are not shown for sake of simplicity.

In one or more embodiments, the I/O ports 605 may be connected via one or more cables to one or more other network devices or clients. The network processing unit 615 may use information included in the network data received at the node 600, as well as information stored in the tables 620, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for enforcing media access control (MAC) learning limits (MLLs), the method comprising:
preventing different sets of MAC addresses from being present in different virtual extensible local area network (VxLAN) tunnel endpoints (VTEPs) of a set of peer VTEPs that are part of an Ethernet segment (ES) by configuring a VTEP of the set of peer VTEPs to perform steps comprising:
in response to receiving a learn notification associated with a MAC address that was learned on a peer VTEP:
determining whether adding the MAC address causes the MLL for the VTEP to be exceeded; and
in response to determining that the MLL will be exceeded if the MAC address was added:
not adding the MAC address to the ES; and sending a MAC delete notification to remove the MAC address from the ES, which causes the MAC address to be removed from the peer VTEP and, if present, to be removed from the other peer VTEPs.

2. The method of claim 1, further comprising, in response to determining that adding the MAC address would not cause the MLL to be reached or exceeded, syncing the MAC address with one or more VTEPs in the ES.

3. The method of claim 1, further comprising, in response to determining that adding the MAC address would cause the MLL to be reached but would not cause the MLL to be exceeded, adding the MAC address to the ES and disabling MAC learning for the ES.

4. The method of claim 1, wherein the VTEP was elected as a master VTEP from the set of peer VTEPs to resolve conflicts on the ES across the set of peer VTEPs.

5. The method of claim 1, further comprising:
in response to receiving an ES shutdown message, which was generated as a result of a peer VTEP determining that learning a MAC address would cause the MLL of the peer VTEP to be exceeded, shutting down the ES at least locally.

6. The method of claim 1, further comprising, in response to receiving a MAC delete message from a master VTEP due to an MLL violation, withdrawing a MAC address identified in the MAC delete message from the VTEP.

7. The method of claim 6, wherein the MAC delete message is comprised in a border gateway protocol Ethernet virtual private network (BGP)-EVPN protocol.

8. The method of claim 1, further comprising:
responsive to receiving an add/sync message from a master VTEP from the set of peer VTEPs, adding the MAC address identified in the add/sync message regardless of whether adding the MAC address would exceed the MLL for the VTEP.

9. An information handling system (IHS) for being a virtual extensible local area network (VxLAN) tunnel endpoint (VTEP) of a set of peer VTEPs that are part of an Ethernet segment (ES), the IHS comprising:
one or more processors; and
a non-transitory computer-readable medium or media comprising one or more sets of instructions which, when executed by at least one of the one or more processors, causes steps to be performed comprising:
in response to receiving a learn notification associated with a media access control (MAC) address that was learned on a peer VTEP:
determining whether adding the MAC address causes a MAC learning limit (MLL) for the VTEP to be exceeded; and
in response to determining that the MLL will be exceeded if the MAC address was added:
not adding the MAC address to the ES; and
sending a MAC delete notification to remove the MAC address from the ES, which causes the MAC address to be removed from the peer VTEP and, if present, to be removed from the other peer VTEPs.

10. The IHS of claim 9, further comprising, in response to determining that adding the MAC address would not cause the MLL to be reached or exceeded, adding the MAC address to the ES and syncing the MAC address with one or more VTEPs in the ES.

11. The IHS of claim 9, further comprising:
in response to determining that the MAC address, if admitted, would cause the MLL to be reached but would not cause the MLL to be exceeded:
adding the MAC address to the ES; and
disabling MAC learning for the ES.

12. The IHS of claim 9, further comprising:
in response to determining that a MAC address, if admitted, would cause the MLL of the VTEP to be exceeded performing steps comprising:
ignoring the MAC address; and
if a MLL violation action of the VTEP is a shutdown, sending a shutdown message to one or more peer VTEPs.

13. The IHS of claim 12, wherein the shutdown message is part of a border gateway protocol Ethernet virtual private network (BGP-EVPN).

14. The IHS of claim 9, further comprising:
in response to receiving a shutdown message from a peer VTEP, which was generated as a result of the peer VTEP determining that a MAC address, if admitted, would cause the MLL of the peer VTEP to be exceeded, initiating a shutdown of the ES, at least locally.

15. The IHS of claim 9, further comprising:
responsive to receiving an add/sync message from a master VTEP from the set of peer VTEPs, adding the MAC address identified in the add/sync message regardless of whether adding the MAC address would exceed the MLL for the VTEP.

16. A non-transitory computer-readable medium or media comprising one or more sequences of instructions which, when executed by at least one processor, causes steps to be performed comprising:
in response to receiving a learn notification associated with a media access control (MAC) address that was learned on a peer virtual extensible local area network (VxLAN) tunnel endpoint (VTEP):
determining whether adding the MAC address causes a media access control (MAC) learning limit (MLL) for the VTEP to be exceeded; and
in response to determining that the MLL will be exceeded if the MAC address was added:
not adding the MAC address to an Ethernet segment (ES); and
sending a MAC delete notification to remove the MAC address from the ES, which causes the MAC address to be removed from the peer VTEP and, if present, to be removed from other peer VTEPs.

17. The non-transitory computer-readable medium or media of claim 16, further comprising, in response to the MLL being reached but not exceeded if the MAC address was added, performing steps comprising:
adding the MAC address;
disabling further MAC learning for the ES; and
syncing the MAC address with one or more VTEPs of a set of VTEPS.

18. The non-transitory computer-readable medium or media of claim 16, further comprising:
in response to receiving an ES shutdown message, which was generated as a result of the peer VTEP determining that learning a MAC address would cause the MLL of the peer VTEP to be exceeded, shutting down the ES, at least locally.

19. The non-transitory computer-readable medium or media of claim 16, further comprising:
   electing from a set of peer VTEPs a master VTEP; and
   responsive to receiving a MAC address add/sync message from the master VTEP from the set of peer VTEPs, adding the MAC address identified in the MAC address add/sync message regardless of whether adding the MAC address would exceed the MLL for the VTEP.

20. The non-transitory computer-readable medium or media of claim 16, further comprising:
   in response to receiving MAC delete message from a master VTEP, withdrawing a MAC address identified in the MAC delete message from the VTEP.

* * * * *